United States Patent
Singh

(10) Patent No.: US 7,747,657 B2
(45) Date of Patent: Jun. 29, 2010

(54) MAPPING HIERARCHICAL DATA FROM A QUERY RESULT INTO A TABULAR FORMAT WITH JAGGED ROWS

(75) Inventor: Hardeep Singh, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 340 days.

(21) Appl. No.: 11/760,619

(22) Filed: Jun. 8, 2007

(65) Prior Publication Data

US 2008/0306983 A1  Dec. 11, 2008

(51) Int. Cl.
*G06F 17/30* (2006.01)
(52) U.S. Cl. .................................... 707/803
(58) Field of Classification Search ............... None
See application file for complete search history.

(56) References Cited

U.S. PATENT DOCUMENTS

| | | | |
|---|---|---|---|
| 6,631,497 B1 | 10/2003 | Jamshidi et al. | |
| 6,694,309 B2 | 2/2004 | Cho et al. | |
| 6,948,134 B2 | 9/2005 | Gauthier et al. | |
| 6,985,895 B2 | 1/2006 | Witkowski et al. | |
| 7,177,855 B2 | 2/2007 | Witkowski et al. | |
| 2008/0162532 A1* | 7/2008 | Daga | 707/102 |

OTHER PUBLICATIONS

Rice, Frank. "Populating an Excel 2003 Worksheet with Multiple Related Records from a Windows Form." MS Office Excel 2003 Technical Articles (2005) Web. Jul. 14, 2009. <http://msdn.microsoft.com/en-us/library/aa203734(office.11).aspx>.*

* cited by examiner

*Primary Examiner*—Mohammad Ali
*Assistant Examiner*—Syed H Hasan
(74) *Attorney, Agent, or Firm*—Patterson & Sheridan, LLP

(57) ABSTRACT

Embodiments of the present invention provide techniques for mapping hierarchical data from a query result into a tabular display, such as a spreadsheet. The tabular display allows some (or all) of the elements included in the hierarchical display to be mapped to positions on the report. In one embodiment, a field of the result that stores hierarchical data with repeating elements (e.g., an XML document) is mapped into the tabular report using jagged rows. This approach allows a user to map both the hierarchical and relational data in the result set to cells in the spreadsheet, and in the process, handle any embedded collection (repeated element) in the hierarchical data.

24 Claims, 5 Drawing Sheets

FIG. 4

```
- <connection url="http://localhost:8080/db2/db2query" jdbcurl="silver">           ← 400
  - <queries>
    - <result name="query1">
      - <mappinginfo>
        <multiple query="query1" treepath="/[0][1][0][2]:/query1/data/ROW/INFO/customerinfo/phone[/[0]
          [0][1][0][2]]" path="/data/ROW/INFO/customerinfo/phone")/>                    ⎫
        <multiple query="query1" treepath="/[0][0]:/query1/data/ROW/[0][0]" path="/data/(ROW)"/>  ⎬ 410
        <map query="query1" treepath="/[1][0][0]:/query1/params/param0/text()" path="/params/param0/text
          ()" cell="Sheet1:$B$6" />                                                     ⎫
        <map query="query1" treepath="/[0][0][0][0]:/query1/data/ROW/CID/text()"         │
          path="/data/ROW/CID/text()" cell="Sheet1:$C$9" />                              ⎬ 415
        <map query="query1" treepath="/[0][0][1][0][0][0]:/query1/data/ROW/INFO/customerinfo/name/text  │
          ()" path="/data/ROW/INFO/customerinfo/name/text()" cell="Sheet1:$D$9" />       │
        <map query="query1" treepath="/[0][0][1][0][2][0]:/query1/data/ROW/INFO/customerinfo/phone/text │
          ()" path="/data/ROW/INFO/customerinfo/phone/text()" cell="Sheet1:$E$9" />      ⎭
      </mappinginfo>
    - 
      - <data>
        - <ROW pos="1" dirty="0">
          - <CID>
              <![CDATA[ 1001  ]]>
            </CID>
          - <INFO>
            - <customerinfo>
                <name> Kathy Smith </name>
              - <addr country=" Canada ">
                  <street> 555 Bailey Ave 112343 </street>
                  <city> Toronto </city>
                  <prov-state> California </prov-state>
                  <pcode-zip> 95141 </pcode-zip>
                </addr>
                <phone type=" work "> 408-555-1358 </phone>
              </customerinfo>
            </INFO>
          </ROW>                                                                        ⎬ 420₁
        + <ROW pos=" 2 " dirty=" 0 ">                                                   ← 420₂
        + <ROW pos=" 3 " dirty=" 0 ">                                                   ← 420₃
        + <ROW pos=" 4 " dirty=" 0 ">                                                   ← 420₄
```

405 (brackets around mappinginfo section)

MAPPING HIERARCHICAL DATA FROM A QUERY RESULT INTO A TABULAR FORMAT WITH JAGGED ROWS

BACKGROUND OF THE INVENTION

1. Field of the Invention

The present invention generally relates to data processing systems, and more particularly to representing hierarchical data from a database query result in a tabular display, such as a spreadsheet.

2. Description of the Related Art

Mapping the results of a relational database query to a spreadsheet is often a straightforward process, as both formats are basically tabular. Typically, each field in a result table is mapped to a column in the spreadsheet. This way each row in the query result is mapped to a row in the spreadsheet. So long as the fields in the query result provide simple values such as a text-string, a date, an integer, or real number, etc., all of the values in the query result may readily be presented in the spreadsheet. However, problems arise when a field of the result set includes more complex information, such as a hierarchical data structure. For example, one of the fields in the result set may be an XML document. Since XML data is hierarchical, each element inside the XML document could potentially map to multiple rows in the spreadsheet.

Spreadsheet applications may provide some features for presenting an XML document in a spreadsheet. These features, however, are generally only applicable for a single XML document and not for multiple XML documents included a field of a query result. Further, even with this approach (commonly referred to as XML document mapping) there is no provision for mapping an XML document with an embedded hierarchy of data to the cells of a spreadsheet. Instead, spreadsheet applications may treat the XML value in the query result as just a character string and add it to the spreadsheet cell as such. Since the XML data actually represents a hierarchy of elements, this approach is insufficient for creating reports on XML data. Another approach is to view the XML result field in hierarchical grids, where each element in the hierarchy is represented by a row in the grid. When a row or field is clicked, the row or field may expand to an encapsulated grid set. That is, the field is presented essentially as a spreadsheet within a spreadsheet. The problem with this approach is that it is not very useful for reporting since it is still representing the data in a hierarchical fashion. The structure of the grid is fixed and it directly maps to the hierarchy of the result and not to a user defined report format which is much more tabular.

Another approach is to flatten the XML inside the query using known SQL/XML functions like XMLTable. This produces a tabular result set with many of the field values repeated for each row. There are a number of drawbacks with this approach, however. First, since each row may contain a lot of repeated data, this makes a report appear unnecessarily cluttered. Second, the query to create a flattened result set can be quite complicated since the query needs to be composed to manipulate the hierarchical data and flatten it out as part of the query. Thus, this approach ends up doing unnecessary transformation to the XML data just because the reporting tool cannot handle hierarchical result sets, resulting in more expensive queries. Nevertheless, many reporting tools follow this approach since it is least disruptive for existing infrastructures.

Accordingly, as demonstrated by the forgoing discussion, there remains a need for techniques for presenting query result data that includes fields of hierarchical data in a tabular representation, such as a spreadsheet.

SUMMARY OF THE INVENTION

Embodiments of the invention include a computer-implemented method of representing hierarchical data from a database query result in a tabular display. The method generally includes obtaining the database query result of an executed database query. The query result includes one or more result fields and at least one of the result fields contains a hierarchal data object. The method also includes encapsulating the query result in a tree hierarchy, retrieving mapping information defining mappings from one or more nodes of the tree hierarchy to specified cells of the tabular display, where at least one of the one or more nodes is flagged as a repeating node, and parsing the tree hierarchy to identify nodes mapped to the specified cells of the tabular display. The method also includes copying data values from the identified nodes of the tree hierarchy to the specified cells of the tabular display. Upon determining, based on the mapping information, that a current node being copied from the tree hierarchy to a cell of the tabular display is flagged as a repeating node, whether multiple instances of the repeating node are present in a given record of the query result is determined. For each of the multiple instances of the repeating node present in the given record of the query result, a row position of the tabular display to which the current node is copied may be incremented, while a column position of the tabular display to create a jagged row in the tabular display for the result fields that contains the hierarchal data object may be maintained.

Another embodiment of the invention includes a computer program product comprising a computer useable storage medium having a computer readable program, wherein the computer readable program, when executed on a computer, causes the computer to perform an operation to generate a tabular display of hierarchical data included in a database query result. The operation generally includes obtaining the database query result of an executed database query. The query result includes one or more result fields and at least one of the result fields contains a hierarchal data object. The operation also includes encapsulating the query result in a tree hierarchy, retrieving mapping information defining mappings from one or more nodes of the tree hierarchy to specified cells of the tabular display, wherein at least one of the one or more nodes is flagged as a repeating node, and also includes parsing the tree hierarchy to identify nodes mapped to the specified cells of the tabular display. The operation also includes copying data values from the identified nodes of the tree hierarchy to the specified cells of the tabular display. Upon determining, based on the mapping information, that a current node being copied from the tree hierarchy to a cell of the tabular display is flagged as a repeating node, whether multiple instances of the repeating node are present in a given record of the query result is determined. For each of the multiple instances of the repeating node present in the given record of the query result, a row position of the tabular display to which the current node is copied is incremented, while a column position of the tabular display to create a jagged row in the tabular display for the result fields that contains the hierarchal data object is maintained.

Another embodiment of the invention includes a system having a processor and a memory containing a program. When executed by the processor, the program is configured to obtain the database query result of an executed database query. The query result includes one or more result fields and at least one of the result fields contains a hierarchal data object. The program is further configured to encapsulate the query result in a tree hierarchy, and retrieve mapping information defining mappings from one or more nodes of the tree hierarchy to specified cells of the tabular display, where at least one of the one or more nodes is flagged as a repeating node. The program is further configured to parse the tree hierarchy to identify nodes mapped to the specified cells of the tabular display, to copy data values from the identified nodes of the tree hierarchy to the specified cells of the tabular display. Upon determining, based on the mapping information, that a current node being copied from the tree hierarchy to a cell of the tabular display is flagged as a repeating node, the program determines whether multiple instances of the repeating node are present in a given record of the query result. And for each instance of the repeating node in the given record of the query result, the program is configured to increment a row position of the tabular display to which the current node is copied and maintain a column position of the tabular display, thereby creating a jagged row in the tabular display for the result fields that contains the hierarchal data object.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates a tree hierarchy generated for an example query, according to one embodiment of the invention.

DETAILED DESCRIPTION OF THE PREFERRED EMBODIMENTS

Figure 1:
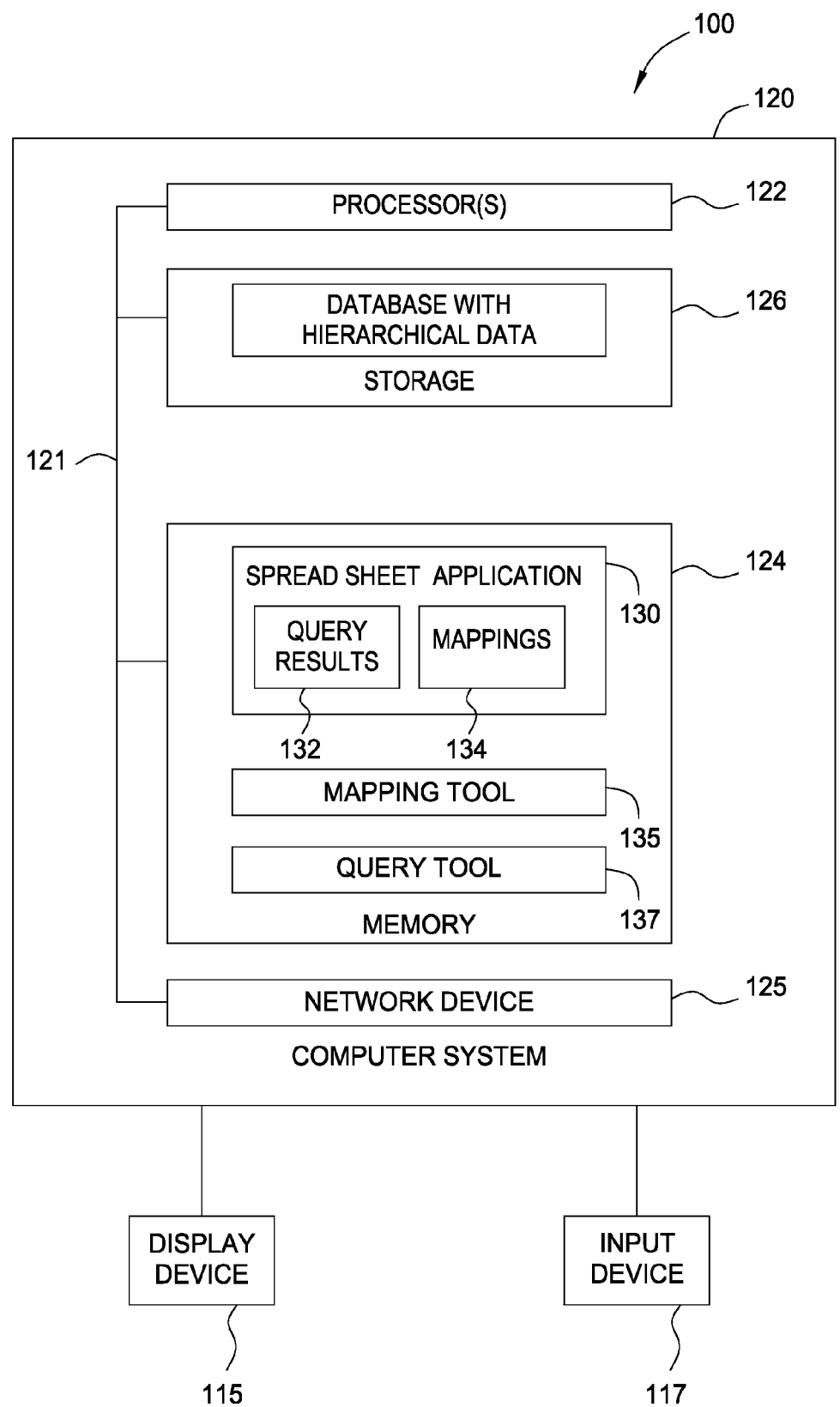
FIG. 1 illustrates an exemplary computing system, according to an embodiment of the invention.

Embodiments of the present invention provide techniques for mapping hierarchical data from a query result into a tabular display, such as a spreadsheet. The tabular display allows some (or all) of the elements included in the hierarchical display to be mapped to positions on the report. In one embodiment, a field of the result that stores hierarchical data (e.g., an XML document) is mapped into the tabular report using jagged rows with repeating elements. That, is the data in the spread sheet may take on a jagged appearance, where repeating data elements in an XML document are mapped to successive rows. This approach allows a user to map both the hierarchical and relational data in the result set to cells in the spreadsheet, and in the process, handle any embedded collection (repeated element) in the hierarchical data.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, an embodiment of the invention is described herein adapted for use with the widely used XML markup language. Accordingly, references to data objects, documents, hierarchal result fields, and XML documents generally refers to data marked up using a well-formed collection of XML tags, elements and/or attributes. A given XML document may also be associated with additional artifacts such as a document type definition (DTD), XSLT transforms XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Such media may be generally referred to as computer readable storage media. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates an example view of a computing environment 100, according to one embodiment of the invention. As shown, computing environment 100 includes computer system 120. Computer system is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 120 is simplified to highlight aspects of the present invention and that computing systems and data communication networks typically include a variety of additional elements not shown in FIG. 1.

As shown, computer system 120 includes a processor (or processors) 122, a storage device 126, a networking device 125, and a memory 124 connected by a bus 121. CPU 122 is a programmable logic device that executes all the instructions included in user applications (e.g., a spreadsheet application 130). Computer system 120 may be connected to a display device 115 and one or more input devices 117. Typically, user input devices 117 include a mouse pointing device and a keyboard, and display device 115 is a CRT monitor or LCD display.

The processing activity and hardware resources on computer system 120 may be managed by an operating system (not shown). Well known examples of operating systems include the Windows® operating system, distributions of the Linux® operating system, and IBM's OS/2® operating system, among others. (Linux is a trademark of Linus Torvalds in the US, other countries, or both). Network hardware may connect computer system 120 to any kind of data communications network, including both wired and wireless networks.

Storage device 126 stores application programs and data for use by computer system 120. Typical storage devices include hard-disk drives, flash memory devices, optical media and the like. Illustratively, storage device 126 includes a database 140 storing hierarchical data. For example, database 140 may provide a relational database, where some tables of relational database store (or link to) XML documents.

As shown, memory 124 stores a number of software applications including a spreadsheet application 130, a mapping tool 135 and a query tool 137. Spreadsheet application 130 includes a query result 132 and mappings 134. In one embodiment, query tool 137 is a software application that allows users to compose and execute queries of the data stored in database 140. For example, query tool 137 may be configured to generate database queries using the well known SQL query language. Frequently, users may compose a query and then run it multiple times. Consider a query used by a product manager to retrieve customer data, for example, the product manager may run the same query to update the results at different times or run the query with different search conditions. Further, data from such a query may include hierarchal results data. That is, the rows of the query result may store both relational data (e.g., a customer identification number) and hierarchal data (e.g., an XML document). In one embodiment, mapping tool 135 may be used to map elements of the hierarchical query results to cells of a spreadsheet. In other words, mapping tool 135 may be used to create a tabular report structure that shows elements of a database query result that includes hierarchal data.

After query tool 137 executes a given database query, query results 132 may be provided to spreadsheet application 130. In turn, spreadsheet application 130 may display query result 132. Mappings 134 may be used to specify where on the spreadsheet elements of query result 132 should be displayed.

In one embodiment, a developer (or other user) may use mapping tool 135 to identify the nodes in a query result 132 and define mappings 134 between the nodes of the query result and cells of a tabular display, such as a spreadsheet. This may be done by treating the query result 132 as a single hierarchical document, with the children of the root node being the rows in the result set. That is, each row of a tabular query result set is treated as the child of a root node in a hierarchical structure. Each row node has as its children the fields returned by the query. Additionally, one or more of the result fields in the result may be returned as a hierarchical data object, such as an XML document. Unlike relational fields storing only a text value, XML fields may further expand to an inner hierarchy. Any leaf node (e.g., an attribute or text element) in the result set hierarchy may be mapped to any of the spreadsheet cells by mappings 134. Additionally, each repeated node (i.e., each collection) in the result set hierarchy that has a node mapped to a cell on the spreadsheet is flagged to indicate that multiple instances of that node may be present in the result set. If a node that has multiple instances of a given element is not flagged as a repeating node, then only the first instance of the node in the result is mapped to a location on the spreadsheet. When the query is preformed, the query result 132 may be mapped to the tabular display, this information (the elements flagged as repeated elements) may be used to increment the spreadsheet row for each repeated element in a given query result, while maintaining the column position. This results in a report structure with jagged rows created to represent the hierarchical data present in rows of query result 132.

Figure 2:
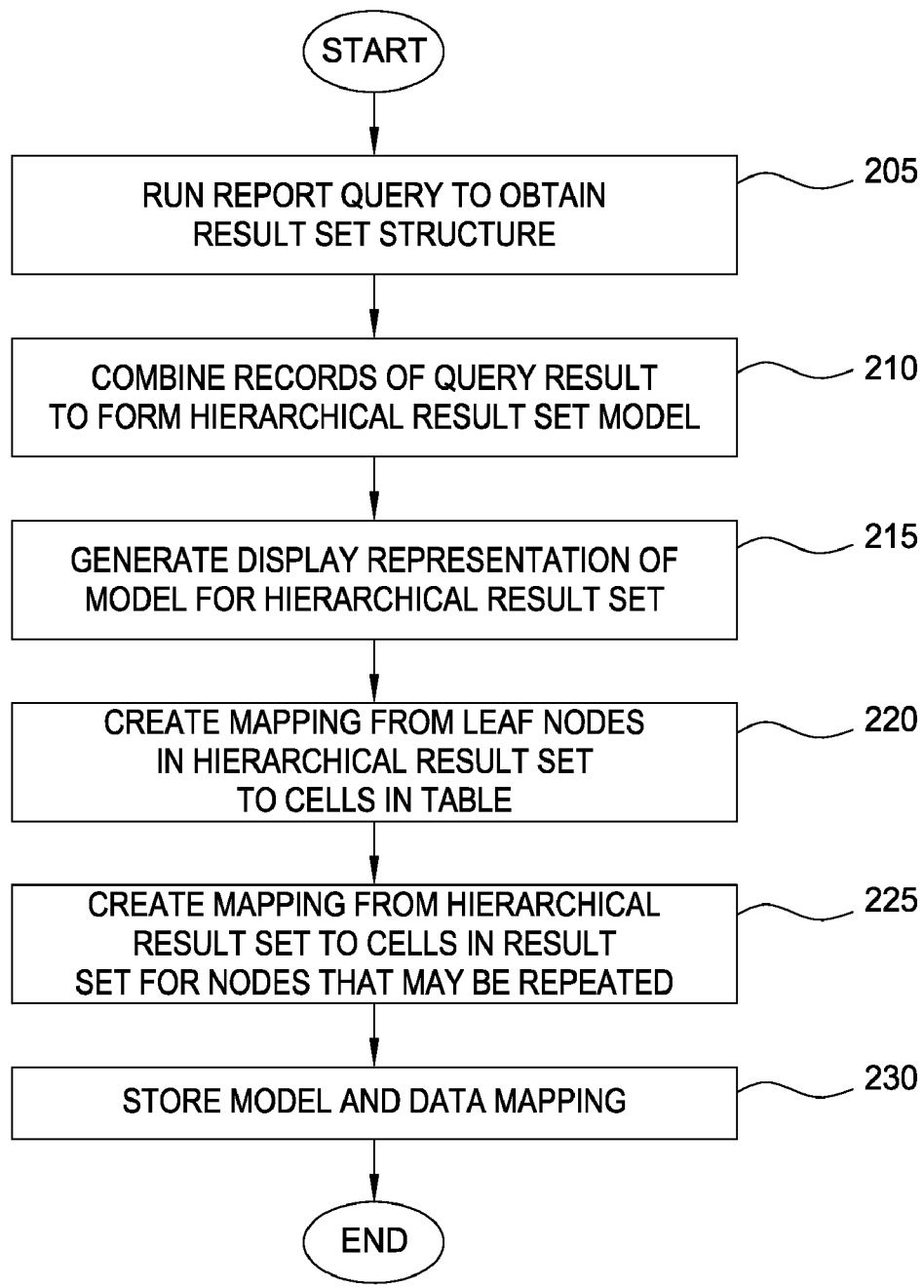
FIG. 2 illustrates a method for creating a mapping between the fields of a query result that includes hierarchal data and a tabular display presentation, such as a spreadsheet, according to one embodiment of the invention.

FIG. 2 illustrates a method 200 for creating a mapping between the fields of a hierarchical query result set and a tabular display presentation, such as a spreadsheet, according to one embodiment of the invention. For purposes of discussion, method 200 is described in conjunction with an example query that returns a result set that contains both relational and XML data stored in a database. Specifically, the query:

"select cid, info from db2admin.xmlcustomer."

This example query returns a two column result table from a database table named "db2admin" in a database named "xmlcustomer." Assume that the "cid" field stores an integer value associated with a customer, and the "info" field stores an XML document that includes a hierarchal set of data describing the customer associated with the "cid" value.

As shown, the method 200 begins at step 205 where a query is executed to obtain a result set. Fields of the result set may be mapped to the cells of a spreadsheet display. At step 210, the result of the query is encapsulated as an XML structure to create a single hierarchy. For example, each row of the query result may be stored as a node of an XML hierarchy. At step 215, the XML hierarchy generated at step 210 may be presented to a user as a tree structure. An example of a tree structure generated from a query result is shown in FIGS. 3 and 4 and described in greater detail below relative to the query set forth above.

At step 220, the user may create one or more mappings between nodes in the hierarchal result set to locations in the tabular display (i.e., to cells in the spreadsheet). For example, a graphical user interface (GUI) provided by spreadsheet application 140 may allow a user to map the leaf nodes of the XML hierarchy by dragging and dropping them to cells in the spreadsheet. At step 225, the user may specify which nodes of the hierarchical result created at step 210 may be repeated in the result set. That is, the user may specify which nodes in the result set can include multiple instances for a single database record. When the query results are displayed in the tabular display, multiple instances of a repeating node may be presented as jagged rows on the display. At step 230, the mappings defined for a given query may be saved.

Figure 3:
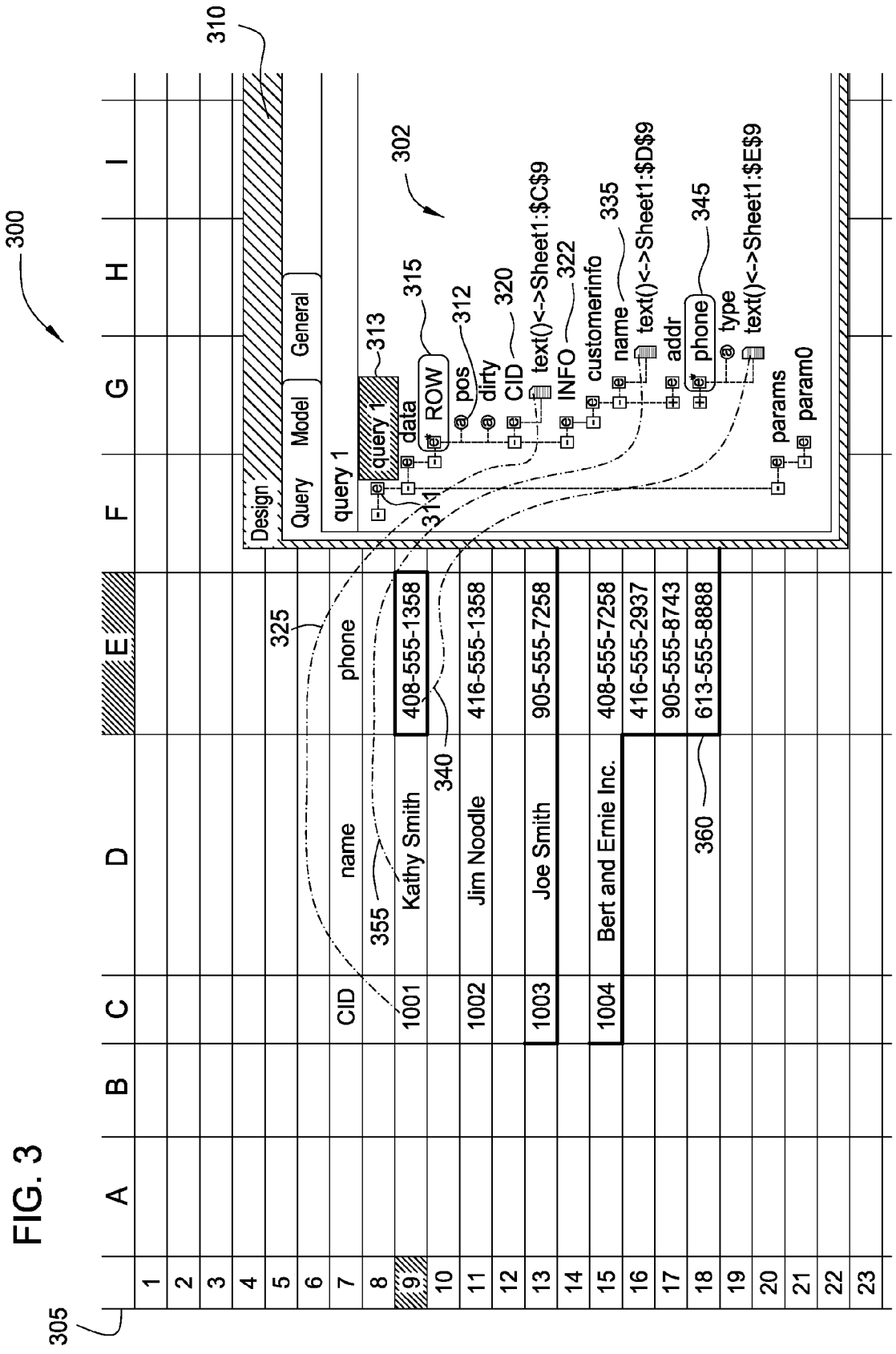
FIG. 3 illustrates an example screenshot of a spreadsheet application and a mapping tool being used to map elements from a hierarchal result structure to locations in a tabular report, according to one embodiment of the invention.

FIG. 3 illustrates an example screen display 300 of a spreadsheet application and a mapping tool being used to map elements from a hierarchal result structure to positions in a tabular display, according to one embodiment of the invention. As shown, screen display 300 shows the query results retrieved from the example query:

"select cid, info from db2admin.xmlcustomer."

As shown, the results of this query mapped into the cells of tabular display 305 and mapping tool 310 shows a tree hierarchy 302 corresponding to this query. In this example, XML elements of the tree are represented with an icon showing the letter "e" 311 in a square and XML attributes are represented using an icon showing the letter "a" 312 in a circle. Also, the query itself is represented in the tree hierarchy 302 as a root node named "query 1" 313. The "data" element of tree hierarchy 302 contains the rows of the query result. The rows of the query result are represented as a row node 315. Specifically, the row node 315 contains the columns specified in the query of the "cid" value (node 320) and the "info" value (node 322). Further, because the "info" field is returned as an XML document, the nodes of the "info" field are also shown in tree 302.

In one embodiment, elements of the tree hierarchy 302 are mapped to positions on tabular display 305. For example, a user may drag a node representing an element (or attribute) of the tree hierarchy and drop it at a particular position on tabular display 305. As shown, portions of each row element 315 (i.e., each row of the query result) are mapped onto tabular display 305. Further, the row element 315 is flagged as a repeating element. In one embodiment, each data element present in a repeating node may be mapped on successive rows of tabular display 305. For example, tabular display 305 includes four rows retrieved using the example query set forth above. As stated, each row of the query result includes a "cid" value and an "info" value (node 322). In this example, the "cid" value (node 320) is mapped into the tabular display 305 beginning at position (C, 9), as indicated by mapping 325. Also, name node 335 and phone number node 345 are mapped onto particular locations of the spreadsheet beginning at positions (D, 9) and (E, 9), as indicated by mappings 340 and 355, respectively.

Based on the mappings defined for this query the "cid," "name," and "phone number" nodes are shown on tabular display 305. Illustratively, the query result includes four records. The "cid" values are shown in column "c" as 1001, 1002, 1003, and 1004. Because the "row" node 315 was flagged as repeating, each value for this node (i.e., each row of the query result, which includes a "cid" value and an "info" value) are mapped onto successively advancing rows of tabular display 305. Additionally, tree hierarchy 302 includes a phone node 345. This node corresponds to one of the hierarchical elements contained by the "info" field returned by the query. Phone node 345 is also marked as a repeating value, as indicated by the circle around this node and the "+" superscript to the element icon. Thus, multiple instances of phone node 345 may be contained as one or more child nodes in the path of the "info" node 322. For example, the display of the row with the "cid" value of 1004 includes an "info" field where the XML document for this instance of the "info" field includes four different phone numbers. When the query result is mapped to the tabular display 305, this information (i.e., the flagging of the "phone" node as a repeating node) may be used to indicate to advance the row for each repeated element, while maintaining the column position. This results in a jagged row 360 being generated for the row of the query result with a "cid" value of 1004 when the query results are mapped into a tabular display.

FIG. 4 illustrates an XML tree hierarchy 400 generated for the example query set forth above, according to one embodiment of the invention. As shown, a <mappinginfo> tag 405 is used to contain mappings 134. Each mapping may specify a position in a tabular display for data values retrieved from the database query. In this example, elements 410 with the <multiple> tag in tree hierarchy 400 indicate the path of the repeated nodes in the tree hierarchy. And elements 415 with the <map> tag in the model indicate the path of the mapped leaf nodes in the tree hierarchy and the target cells for these elements in the tabular display. Additionally, the four result rows shown in tabular display 305 of FIG. 3 are contained in row elements $420_{1-4}$.

Figure 5:
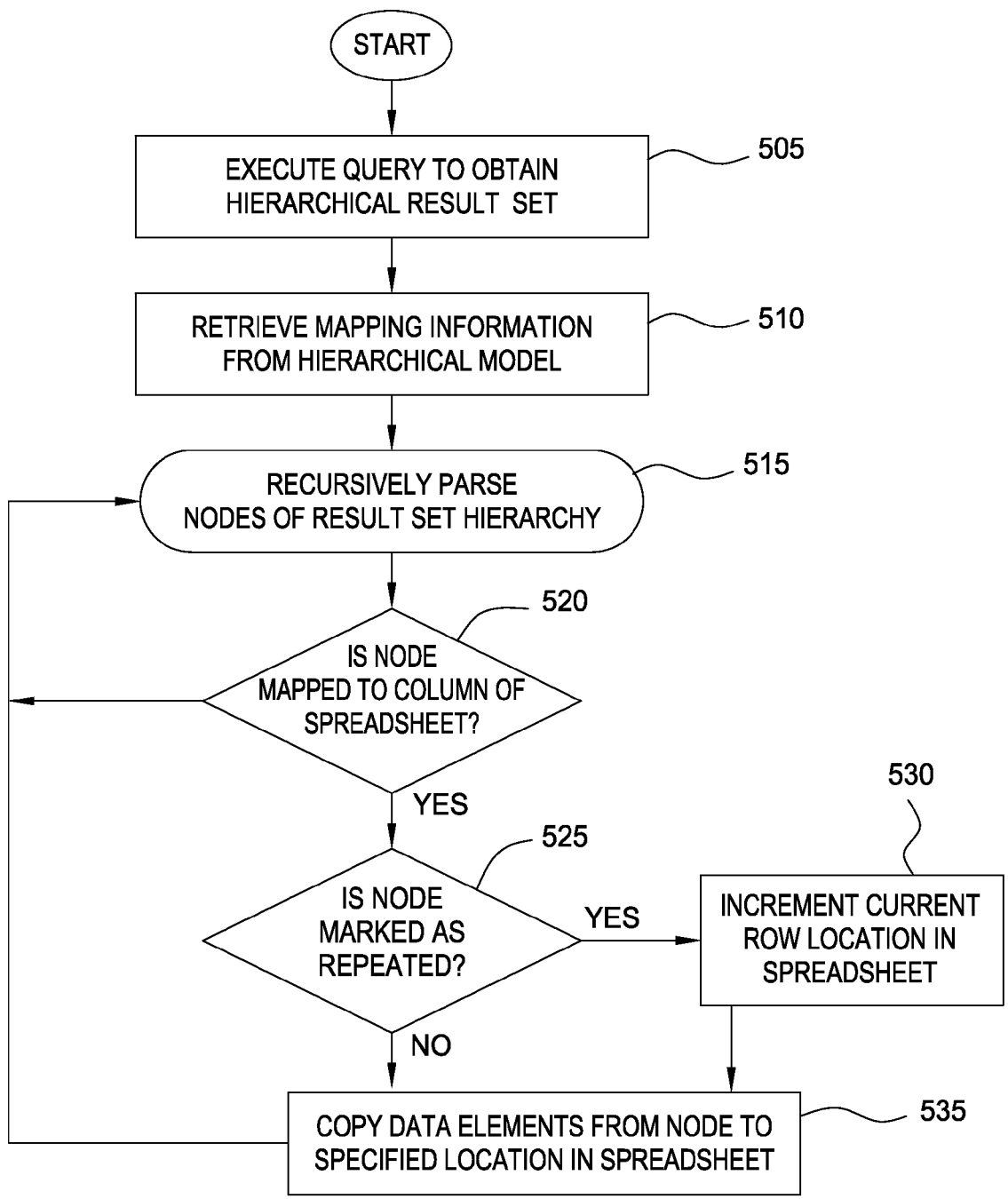
FIG. 5 illustrates a method of representing hierarchical data included in a database query result in a tabular display, according to one embodiment of the invention.

FIG. 5 illustrates a method of representing hierarchical data included in a database query result in a tabular display, according to one embodiment of the invention. As shown, the method 500 begins at step 505 where a database query is executed to retrieve a result that includes fields containing hierarchal data (e.g., an XML document) and fields containing non-hierarchical data (e.g., text or numerical values). As described above, the query result may be encapsulated in a tree structure. For example, FIG. 4 shows tree hierarchy 400 which includes a query result (rows $420_{1-4}$) retrieved from the example query: "select cid, info from db2admin.xmlcustomer." The tree hierarchy 400 also includes <mappinginfo> tag 405 used to contain the mappings used to map the query results into a tabular display. At step 510, mapping information for the tree hierarchy is retrieved from the hierarchical model generated at step 505 (e.g., nodes of the <mappinginfo> tag 405).

At steps 515-525, the data values from the query result are mapped onto the tabular display, based on the mapping information retrieved at 510. At step 520, it is determined whether any descendant of the current node is mapped to a column of the tabular display. If so, then at step 525, if the node is also marked as repeated, then a current row count is incremented (step 530). That is, when nodes flagged as repeating are encountered while performing steps 515-525, the current row of the spreadsheet is incremented for each instance of the repeating node present in a given row of the query results. When a node is encountered with descendants which are themselves marked as repeating, then the descendant is evaluated to determine whether the descendant node has any siblings. For each sibling element present in a given record, the row count is incremented. Values from descendant leaf nodes are written to the tabular display. That is, all mapped nodes that are between the current node and any descendant node that has been marked as repeated are also parsed, and for each instance of a descendant node, the row is incremented by one as values are written to the tabular display. This creates the jagged rows in tabular display that represent the hierarchical data present in fields of a query result.

Of course, a node that is marked to be repeated does not need in itself to be mapped to the tabular display. Thus, as the spread sheet application parses through the query result hierarchy it checks for the repeated nodes. On encountering a repeated node the spread sheet application determines whether the node remarked as repeating, in fact, has any siblings present with the same node name. That is, whether multiple instances of the repeating node are, in fact, present in the query result set. For each sibling found the spreadsheet increments the row count as data values are written to the tabular display, creating the jagged rows for records with repeating elements. Otherwise, until a repeated sibling is found values from all the descendant nodes that have been mapped to the tabular display are copied to the same row of the tabular display. Since the mapping process is recursive this process is repeated if any descendant node has been marked as repeated and that node has siblings with the same node name. In other words, marking a node as repeated may cause the spreadsheet application to increment the row count if that node has siblings with the same node name. Note however, the repeated node does not have to be mapped to the tabular display.

For example, the first node of the result set shown in FIG. 4, corresponds to row $420_1$. This row is mapped onto the tabular display as indicated by the second <multiple> element 410 of mapping info 405 shown in FIG. 4. The descendant nodes of row $420_1$ are then parsed to identify nodes mapped onto the tabular display. This process is then repeated for nodes containing rows $420_2$, $420_3$, and $420_4$ of the query result. When, row $420_4$ is reached (corresponding to the row with the "cid" value of 1004 in FIG. 3), the "info" element for this row includes multiple instances of the phone number node. Additionally, the phone number node is flagged as a repeating node, as indicated by the first <multiple> element 410 of mapping info 405 shown in FIG. 4. Thus, as the phone numbers included in row $420_4$ are mapped onto the tabular display, the current row of the spreadsheet is increment, creating jagged row 360 of FIG. 3.

Additionally in one embodiment, once a result set is mapped onto a tabular display (e.g., spreadsheet), users may update values presented in the display. For example, users may interact with a spreadsheet application to update data values retrieved from the database and mapped into a spreadsheet. That is, a spreadsheet displaying a tabular report can also be used to update the database with modifications made to the cells of the report.

In one embodiment, to execute an update, the method 500 may be performed but instead of copying the data from the node of the tree hierarchy to a cell of the tabular display (i.e., step 535 of method 500) the reverse is performed. That is, modified data values may be copied from the cell of the spreadsheet to the node. Once the cells of the tabular display are parsed, the "row" nodes of the tree hierarchy may be passed back to the database using an update query. Further, every row in which the data is modified may be marked as dirty and sent back to the data source to be updated. This allows for only modified rows to be included in the update process, improving efficiency. For example, the "dirty" XML attribute defined for instances of the row node (i.e., row node 315 of FIG. 3) may be used to flag a row that has been modified in the spread sheet display. Thus, in addition to enabling hierarchical data from a data source result set to be mapped to a tabular display for reporting, embodiments of the invention may be used to update the hierarchical result set back to the data source with changes made in spreadsheet to the data.

Advantageously, unlike the existing techniques for presenting XML query results in a tabular display where XML values are treated as a text string, at least one embodiment of the invention treats an XML value in the result set as an object hierarchy, allowing it to be mapped as such to the tabular display. Further, embodiments of the invention can process repeated elements in the XML documents such as collections inside collections. Only mapped values are shown in the tabular display, and not the complete result set hierarchy. Thus, reports created using embodiments of the invention may be more readable and less cluttered since they do not include extra irrelevant information. Further, since mappings can be defined for both relational data and hierarchical data, there is no need to flatten the result in the query using SQL/XML functions like XMLTable, according to at least one embodiment of the invention. Therefore, database queries may be simpler and have better performance.

While the foregoing is directed to embodiments of the present invention, other and further embodiments of the invention may be devised without departing from the basic scope thereof, and the scope thereof is determined by the claims that follow.

What is claimed is:

1. A computer-implemented method of representing hierarchical data from a database query result in a tabular display, comprising:
   obtaining the database query result of an executed database query, wherein the query result includes one or more result fields, and wherein at least one of the result fields contains a hierarchal data object;
   encapsulating the query result in a tree hierarchy;
   retrieving mapping information defining mappings from one or more nodes of the tree hierarchy to specified cells contained within a plurality of rows of the tabular display, wherein at least one of the one or more nodes is flagged as a repeating node;
   parsing the tree hierarchy to identify the one or more nodes mapped to the specified cells of the tabular display;
   copying data values from the identified one or more nodes of the tree hierarchy to the specified cells of the tabular display;
   upon determining, based on the mapping information, that a current node being copied from the tree hierarchy to a cell of the tabular display is flagged as the repeating node, determining whether multiple instances of the repeating node are present in a given record of the query result; and
   for each of the multiple instances of the repeating node present in the given record of the query result, incrementing a row position of the tabular display to which the current node is copied, while maintaining a column position of the tabular display to create a jagged row in the tabular display for the result fields that contain the hierarchal data object.

2. The method of claim 1, wherein the tree hierarchy represents the query result as a single hierarchical document, wherein child nodes of a root node of the single hierarchical document are the rows of the query result, and wherein child nodes of each row are the one or more result fields included in the query result.

3. The method of claim 1, further comprising, upon determining that the data values copied to the specified cells of the tabular display have been modified, copying the modified data values from the specified cells of the tabular display to the corresponding nodes of the tree hierarchy.

4. The method of claim 3, further comprising, performing an update query to update the database with the modified data values copied to the tree hierarchy.

5. The method of claim 1, wherein the tree hierarchy represents the query result as a single hierarchical document, wherein child nodes of the root node are the rows of the query result, and wherein child nodes of each row are the one or more fields.

6. The method of claim 1, wherein the hierarchal data object is an XML document.

7. The method of claim 1, wherein the database query is a relational database query.

8. The method of claim 1, wherein the tabular display is a spreadsheet.

9. A computer program product comprising a computer useable storage medium having a computer readable program, wherein the computer readable program when executed on a computer causes the computer to perform an operation to generate a tabular display of hierarchical data included in a database query result, the operation comprising:
obtaining the database query result of an executed database query, wherein the query result includes one or more result fields, and wherein at least one of the result fields contains a hierarchal data object;
encapsulating the query result in a tree hierarchy;
retrieving mapping information defining mappings from one or more nodes of the tree hierarchy to specified cells contained within a plurality of rows of the tabular display, wherein at least one of the one or more nodes is flagged as a repeating node;
parsing the tree hierarchy to identify the one or more nodes mapped to the specified cells of the tabular display;
copying data values from the identified one or more nodes of the tree hierarchy to the specified cells of the tabular display;
upon determining, based on the mapping information, that a current node being copied from the tree hierarchy to a cell of the tabular display is flagged as the repeating node, determining whether multiple instances of the repeating node are present in a given record of the query result; and
for each of the multiple instances of the repeating node present in the given record of the query result, incrementing a row position of the tabular display to which the current node is copied, while maintaining a column position of the tabular display to create a jagged row in the tabular display for the result fields that contain the hierarchal data object.

10. The computer-readable storage medium of claim 9, wherein the tree hierarchy represents the query result as a single hierarchical document, wherein child nodes of a root node of the single hierarchical document are the rows of the query result, and wherein child nodes of each row are the one or more result fields included in the query result.

11. The computer-useable storage medium of claim 9, wherein the operation further comprises, upon determining that the data values copied to the specified cells of the tabular display have been modified, copying the modified data values from the specified cells of the tabular display to the corresponding nodes of the tree hierarchy.

12. The computer-readable storage medium of claim 11, wherein the operation further comprises, performing an update query to update the database with the modified data values copied to the tree hierarchy.

13. The computer-useable storage medium of claim 9, wherein the tree hierarchy represents the query result as a single hierarchical document, wherein child nodes of the root node are the rows of the query result, and wherein child nodes of each row are the one or more fields.

14. The computer-useable storage medium of claim 9, wherein the hierarchal data object is an XML document.

15. The computer-useable storage medium of claim 9, wherein the database query is a relational database query.

16. The computer-useable storage medium of claim 9, wherein the tabular display is a spreadsheet.

17. A system, comprising:
a processor; and
a memory containing a program which, when executed by the processor, is configured to:
obtain the database query result of an executed database query, wherein the query result includes one or more result fields, and wherein at least one of the result fields contains a hierarchal data object;
encapsulate the query result in a tree hierarchy;
retrieve mapping information defining mappings from one or more nodes of the tree hierarchy to specified cells contained within a plurality of rows of the tabular display, wherein at least one of the one or more nodes is flagged as a repeating node;
parse the tree hierarchy to identify the one or more nodes mapped to the specified cells of the tabular display;
copy data values from the identified one or more nodes of the tree hierarchy to the specified cells of the tabular display;
upon determining, based on the mapping information, that a current node being copied from the tree hierarchy to a cell of the tabular display is flagged as the repeating node, determine whether multiple instances of the repeating node are present in a given record of the query result; and
for each of the multiple instances of the repeating node present in the given record of the query result, increment a row position of the tabular display to which the current node is copied and maintain a column position of the tabular display to create a jagged row in the tabular display for the result fields that contain the hierarchal data object.

18. The system of claim 17, wherein the tree hierarchy represents the query result as a single hierarchical document, wherein child nodes of a root node of the single hierarchical document are the rows of the query result, and wherein child nodes of each row are the one or more result fields included in the query result.

19. The system of claim 17, wherein the program is further configured to, upon determining that the data values copied to the specified cells of the tabular display have been modified, copy the modified data values from the specified cells of the tabular display to the corresponding nodes of the tree hierarchy.

20. The system of claim 19, wherein the program is further configured to perform an update query to update the database with the modified data values copied to the tree hierarchy.

21. The system of claim 17, wherein the tree hierarchy represents the query result as a single hierarchical document, wherein child nodes of the root node are the rows of the query result, and wherein child nodes of each row are the one or more fields.

22. The system of claim 17, wherein the hierarchal data object is an XML document.

23. The system of claim 17, wherein the database query is a relational database query.

24. The system of claim 17, wherein the tabular display is a spreadsheet.

* * * * *